US009735929B2

(12) United States Patent
Folkmanis et al.

(10) Patent No.: US 9,735,929 B2
(45) Date of Patent: *Aug. 15, 2017

(54) SYSTEM AND METHOD FOR SYNCHRONIZING MULTI-LEVEL OUTPUT DEVICES IN AN UNRELIABLE NETWORK

(71) Applicant: Google Inc., Mountain View, CA (US)

(72) Inventors: Girts Folkmanis, San Francisco, CA (US); Paul Heninwolf, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,809

(22) Filed: Jul. 12, 2016

(65) Prior Publication Data

US 2016/0323072 A1    Nov. 3, 2016

Related U.S. Application Data

(63) Continuation of application No. 14/529,195, filed on Oct. 31, 2014, now Pat. No. 9,420,580, which is a
(Continued)

(51) Int. Cl.
*H04W 4/00* (2009.01)
*H04L 1/18* (2006.01)
(Continued)

(52) U.S. Cl.
CPC ........ *H04L 1/1867* (2013.01); *H04L 12/2803* (2013.01); *H04L 45/00* (2013.01);
(Continued)

(58) Field of Classification Search
None
See application file for complete search history.

(56) References Cited

U.S. PATENT DOCUMENTS 6,750,781 B1    6/2004    Kim
8,897,193 B2    11/2014   Lee et al.
(Continued)

FOREIGN PATENT DOCUMENTS

WO    WO-2010150155 A1    12/2010
WO    WO-2011024106 A1    3/2011

OTHER PUBLICATIONS

Extended European Search Report dated Mar. 8, 2017 as received in Application No. 13194527.1.

*Primary Examiner* — Otis L Thompson, Jr.
(74) *Attorney, Agent, or Firm* — Morris & Kamlay LLP

(57) ABSTRACT

A method and system are described that allow a device operating in coordination with other devices to synchronize the devices operation with the other devices. A controllable device processor may determine that a received data packet is a retransmission of an initial control command data packet. The processor may obtain from the retransmitted data packet a start value and a time indicator related to performance of the operation. A ramp rate related to the operation to be performed may be obtained. Using the time indicator, an adjusted ramp rate may be calculated. An output value for the device may be set based on the start value, the adjusted ramp rate, and the time indicator. The adjusted ramp rate may result in completing the operation at substantially the same time as though the device received the original command.

20 Claims, 4 Drawing Sheets

Related U.S. Application Data continuation of application No. 13/720,388, filed on Dec. 19, 2012, now Pat. No. 8,917,715.

(51) Int. Cl.
  *H04L 12/701* (2013.01)
  *H04L 12/28* (2006.01)
  *H05B 37/02* (2006.01)
  *H04L 29/08* (2006.01)
  *H04W 72/04* (2009.01)

(52) U.S. Cl.
  CPC ....... *H04L 67/125* (2013.01); *H04W 72/0433* (2013.01); *H05B 37/0209* (2013.01); *H05B 37/0254* (2013.01); *H05B 37/0272* (2013.01)

(56) References Cited

U.S. PATENT DOCUMENTS

| | | | |
|---|---|---|---|
| 8,917,715 B2 * | 12/2014 | Folkmanis | H04L 45/00 370/351 |
| 9,420,580 B2 * | 8/2016 | Folkmanis | H04L 45/00 |
| 2007/0185597 A1 | 8/2007 | Bejean et al. | |
| 2008/0191837 A1 | 8/2008 | Stocker | |
| 2008/0220722 A1 | 9/2008 | Smith | |
| 2009/0206983 A1 | 8/2009 | Knode et al. | |
| 2010/0013609 A1 | 1/2010 | Symoen et al. | |
| 2011/0053492 A1 | 3/2011 | Hochstein | |
| 2011/0142467 A1 | 6/2011 | Ohhashi et al. | |
| 2011/0184577 A1 | 7/2011 | Ilyes | |
| 2012/0165990 A1 | 6/2012 | McCormack | |
| 2013/0307677 A1 | 11/2013 | Tarr et al. | |
| 2014/0012400 A1 | 1/2014 | Hidaka et al. | |

* cited by examiner

SYSTEM AND METHOD FOR SYNCHRONIZING MULTI-LEVEL OUTPUT DEVICES IN AN UNRELIABLE NETWORK

CROSS-REFERENCE TO RELATED APPLICATIONS

This application is a continuation of U.S. application Ser. No. 14/529,195, filed Oct. 31, 2014, which is a continuation of U.S. application Ser. No. 13/720,388, filed Dec. 19, 2012 (U.S. Pat. No. 8,917,715), the disclosures of which are incorporated by reference in their entirety.

BACKGROUND

Home automation networks may be subject to a variety of sources of interference and/or shielding that prevents the successful delivery of control signals to controllable devices in the network. There are many types of appliances or devices that may be controlled as a single unit, such as lights, window shades, water pressure in fountains, music volume to speakers, and the like. A problem may occur when less than all of the multiple output devices or appliances receive the control signals.

Home automation networks may operate at frequencies, such as 900 MHz, and 802.11 frequencies (Wi-Fi), that are commonly interfered with by other devices, such as microwave ovens, baby monitors and the like. As a result, communications over home automation networks may be unreliable, and some of the appliances or devices may not receive control signals. Missed control signals may cause synchronization problems when less than all of the multiple output devices or appliances receive the control signals.

For example, a command for a group lights to adjust to a specific lighting level may be sent over an unreliable wireless network in which data communication can be lost. As a result, if one light in a group of lights operating together fails to receive the command then uneven lighting may occur and the results may not be aesthetically pleasing. To make sure all devices received the message, various schemes have to be used to confirm successful receipt of the message, for example, requiring each target device to "acknowledge" the reception of the command. If any of the target devices fail to acknowledge the message, the message may be resent. The acknowledgement requirement adds further latency to the network, which further delays the response of the lagging light.

Often times a centralized command and processing model is used in which a central controller calculates the performance parameters of all of the devices that are being controlled as a single unit, and sends commands to a plurality of devices to perform an action. For example, an initial command may include a first set of initial device parameters based on an expected state of the respective devices. The central controller may issue intermediary commands with updated device parameters for each of the respective plurality of devices so the performance of the action by the respective devices may remain synchronized. This leads to an additional level of complexity at the central controller. In addition, the centralized command model does not account for errors in the expected states of the respective device. As a result, there may be abrupt changes to the operation of the device when an intermediary command is received.

BRIEF SUMMARY

According to an implementation of the disclosed subject matter, the performance of an action by a plurality of devices operating as a single unit may be synchronized. A controllable device processor may determine that a received data packet is a retransmission of an initial control command data packet. The retransmitted data packet may include operation commands that may cause the controllable device to perform an operation that was requested to be performed by a plurality of controllable devices. The processor may obtain a start value and a time indicator related to performance of the operation from the retransmitted data packet. The start value may be equal to an expected initial value setting of the device. A time when the original command was given may be determined and a ramp rate related to the operation to be performed may also be obtained. Using the time indicator, an adjusted ramp rate may be calculated. An output value for the device may be set based on the adjusted ramp rate. The adjusted ramp rate may result in completing the operation at substantially the same time as though the device received the original command.

According to an implementation of the disclosed subject matter, a controllable device processor may determine that a received data packet is a retransmission of an initial control command data packet. The retransmitted data packet may include operation commands that may cause a device to perform an operation requested by a control device. An expected start value and a duration of the operation may be obtained from the retransmitted data packet. The expected start value may be equal to an expected output value setting of the device at the time the retransmitted performance request is received and the duration may be an elapsed time from receipt of an original performance request until completion of the performance. The processor may determine a time when the original command was given and may compare the duration of the operation to the determined time delay. The controllable device processor may signal a controllable device output value based on the results of the comparison. The ramp rate may be a value representing a rate at which the operation is to complete.

According to an implementation of the disclosed subject matter, a system for synchronizing performance of an operation by a plurality of devices operating as a single unit is provided. The system may include a plurality of controllable devices, a controller device, and a communication network. The plurality of output devices may include operating in coordination with one another to perform an operation. The controller device may be configured to control the plurality of output devices. The communication network may be communicatively coupled to the controller device and the plurality of output devices. The controller may be configured to retransmit a control command to the plurality of output devices. The control command may include a start value equal to an expected initial value setting of the device and an operation time value representing the time between the transmission of an earlier transmitted, initial control command until completion of the performance by the plurality of controllable devices. The controllable device may be configured to identify a received command as a retransmission of an earlier transmitted, initial control command, and obtain the start value and the elapsed time for performance of the operation from the reissued control command in response to not receiving the initial control command. The output device may determine a time when the initial control command was given. The duration of the operation may compare to the time delay. Based on the results of the comparison, the controllable device may set an output value for the device based on the start value, a ramp rate, and the time delay duration.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural features in more detail than may be necessary for a fundamental understanding of the disclosed subject matter and various ways in which it may be practiced.

DETAILED DESCRIPTION

Implementations of the disclosed subject matter may be usable with a plurality of devices that are to respond to the same command to perform an action. When at least one of the plurality of devices fails to receive a command due to an unreliable network connection, the described systems and techniques may overcome the failed receipt of a command and synchronize of the operation of the plurality of devices. When multiple devices are operated in unison, such as lighting, draperies, and blinds, the provided system and method allow for more efficient operation and, depending on the operation, an aesthetically pleasing and coordinated presentation.

For example, if a room contains multiple individually controllable lights, the user might want to dim them all on and off with a single wall light switch. To achieve a more pleasant effect, the lights may be dimmed gradually (faded in and out), instead of jumping from a starting level (e.g. fully on) to target level (e.g., half off). When using a wall switch, the user may instantly indicate the amount of dimming desired without having to continue to interact with the wall switch. In other words, a user may touch an input device to perform a command and forget it because the user can assume the command will be successfully performed.

If a message is missed by one or more devices, but the rest of the devices start executing the command, this can create an inconsistent appearance (e.g., two lights start dimming, while a third remains bright) that is not aesthetically pleasing. One method to overcome this inconsistency is to allow the other devices to "catch up" to the current output level, minimizing the time during which the brightness levels are out of synchronization.

In current home automation networks, a retransmitted command packet causes the action to start from the same point as if it was received in when the command packet was initially transmitted. It would be advantageous if a system would compensate the output settings of the controllable device for the time delay from when the original command was supposed to be received and when the retransmitted initial command was received.

Figure 1:
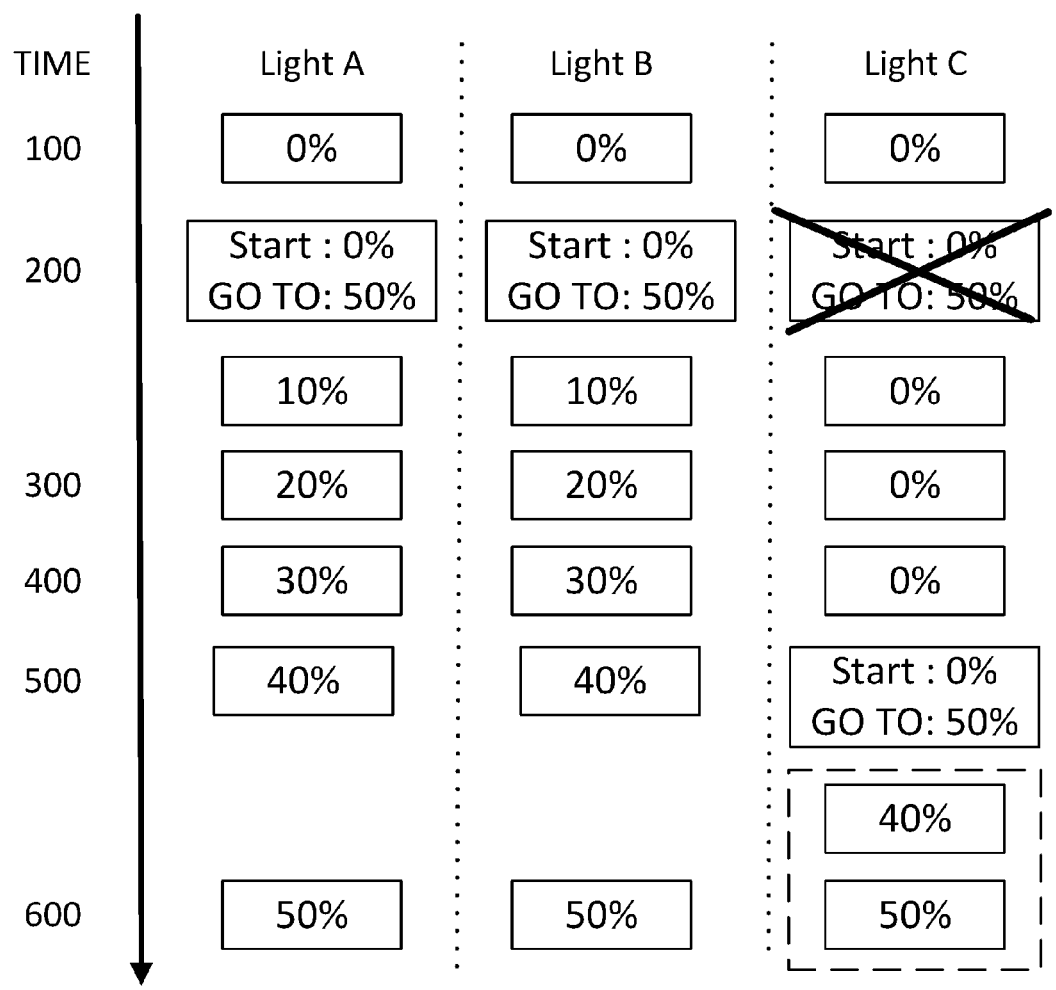
FIG. 1 shows a graphic of a possible use scenario according to an implementation of the disclosed subject matter.

FIG. 1 shows a graphic of a possible use scenario according to an implementation of the disclosed subject matter. To initiate the operation, a controller, such as a home automation network controller or an intermediary control device, such as a gateway controller, smartphone, wall switch, presence-detection device or the like, may send an initial control command to the respective lights. To enable devices to synchronize to the intended output state, the devices may calculate the instantaneous output value for any time value during the transition from an initial state to the intended output state. FIG. 1 illustrates a scenario in which three lights, Light A, Light B and Light C, are controllable devices acting in coordination or cooperation with one another to dim the light intensity in a room. The Lights A, B and C may be controllable devices that may include memory, processors and transceivers that allow the lights to communication with a control device that may be remote from the lights. The communication path may be either a wired or wireless. The commands may include data that identifies the command as an initial command or a retransmission command, and that identifies the operation/action to be performed. For example, the command(s) may include a bit(s) may indicate that the command is a dim command, a turn ON command, or some other command.

The controllable device memory may store preset responses to certain commands. For example, a command to dim the lights for a movie may have preset control parameters, such as preset end points and a preset ramp rate to meet the dim settings. The preset control parameters may be set by a user or at time of manufacture of the controllable device. Assume for the sake of the example, the Lights A, B and C are at their highest intensity at time t=100.

As shown in FIG. 1, the controllable devices, Light A, Light B, receive, at time t=200, an initial control command requesting performance of an operation or action. The terms "operation" and "action" may be used interchangeably and refer to some operation or action that is to be performed by the controllable devices. However, for some reason (e.g., interference) Light C does not receive the command or receives only a partial command that cannot be interpreted or error-corrected by the Light C processor. The command may include an expected start value, e.g., 0%, with an instruction to go to an end value, e.g., a 50% output value. The data packet containing the initial performance request command may also include other data. For example, the other data may be data indicating whether the command is an initial command or a retransmission command, the number of retransmissions, the time at which the command was sent, a ramp rate, a bit indicating that the command is an initial performance request command, an end value, a time duration of the action to be performed, and additional information, for example, a source identifier, a destination identifier, routing information, checksums and the like.

The ramp rate may indicate to the controllable device how quickly the device may transition from a current value (or expected start value) to the commanded value. The ramp rate may be used by the device to calculate the instantaneous value at different time intervals as the device transitions from the expected start value to the end value. Alternatively, the ramp rate may be used to calculate step values for transitioning to an end value. In general, the ramp rate, start values and end values may be used to calculate any form of output values. The ramp rate for dimming lights may be different from the ramp rate for raising the light's brightness level. Of course, the ramp rate may be either positive or negative. For example, the ramp rate for dimming lights may be negative, while the ramp rate for increasing light brightness may be positive. The ramp rate may be provided in the command, stored in the controllable devices' memory or may be derived by the processor using the controllable device parameters provided with the command.

Returning to the example of FIG. 1, according to the initial performance request command data and the ramp rate, Lights A and B may begin the transition to a output value 10% less than the expected start value (100%) upon receipt of the performance request command, and transition by 10% at each of the following intervals until the commanded end value that may be included the data packet. For example, at time t=500, all lights are expected to be at value 40%, and at time t=600 and beyond, 50%. FIG. 1 shows discrete time units to simplify the example, but the output level changes could be of a much finer granularity, nearly continuous or continuous. To be able to calculate the output value for any given time T, the devices may use the start time, duration, start value and ramp rate:

<output value>={<start value>+<ramp rate>*<duration> if T>=duration {<start value>+<ramp rate>*T otherwise Some of the values can also be omitted or replaced, e.g., end time could be provided instead of duration. The end value may replace the ramp rate, or the ramp rate may be pre-configured. If it can be assumed that the state of the network is synchronized, the start value may be omitted. Alternatively, the start time may be omitted if the transmission is instantaneous, e.g., if messages are for local broadcast only and not propagated through a network.

Continuing with the example of FIG. 1, the crossed out command below Light C at time 200 illustrates that Light C did not receive the initial performance request command. As a result, Light C does not change its output value at times 200, 300 or 400. However, a performance request command repeating the same command as the initial command that was transmitted at time 200 may be retransmitted at time 500. Light C receives the retransmitted command, and using data in the retransmitted command message, the Light C may synchronize itself to the right level after receiving the retransmitted command message. One or more data packets in the retransmitted command message may include the start level and end level, so Light C can match the levels of Light A and B after receiving the retransmitted packet at time 500. Light C may determine that the received command message is a retransmitted command message. Using the data included in the data packet, Light C may calculate an output value that matches, or that is in synchronization, with the expected output values of Lights A and B at the time the command is received. For example, Light C may take the data in the data packet of the retransmitted command message and calculate a 40% output value that synchronizes its output value with that of Lights A and B. By time 600, Lights A, B and C are synchronized and reach the end value, 50% output, at the same time.

Depending on the control application, the retransmitted command message may include only the data provided in the initial performance request command, or it may include more or less information. For example, the other data may include data indicating the time the command was sent, the ramp rate, and the like. No matter whether the retransmitted command message includes more or less data, in an implementation it should include sufficient data that the controllable device is able to calculate its own output values synchronizing its output with the other devices that it is working in coordination with to provide the expected performance. In addition, if the network does not have an absolute shared time, the devices may synchronize to one another using a relative time.

An advantage of the presently disclosed subject matter is that the individual controllable devices are capable of determining an output value based on minimal data provided by a controller. This is beneficial in a situation where, for example, a controller may store in memory an expected state of a controllable device that is different from the actual state of the controllable device. Implementations of the presently disclosed subject matter are able to compensate for the controller error, and determine a corrected response.

Figure 2:
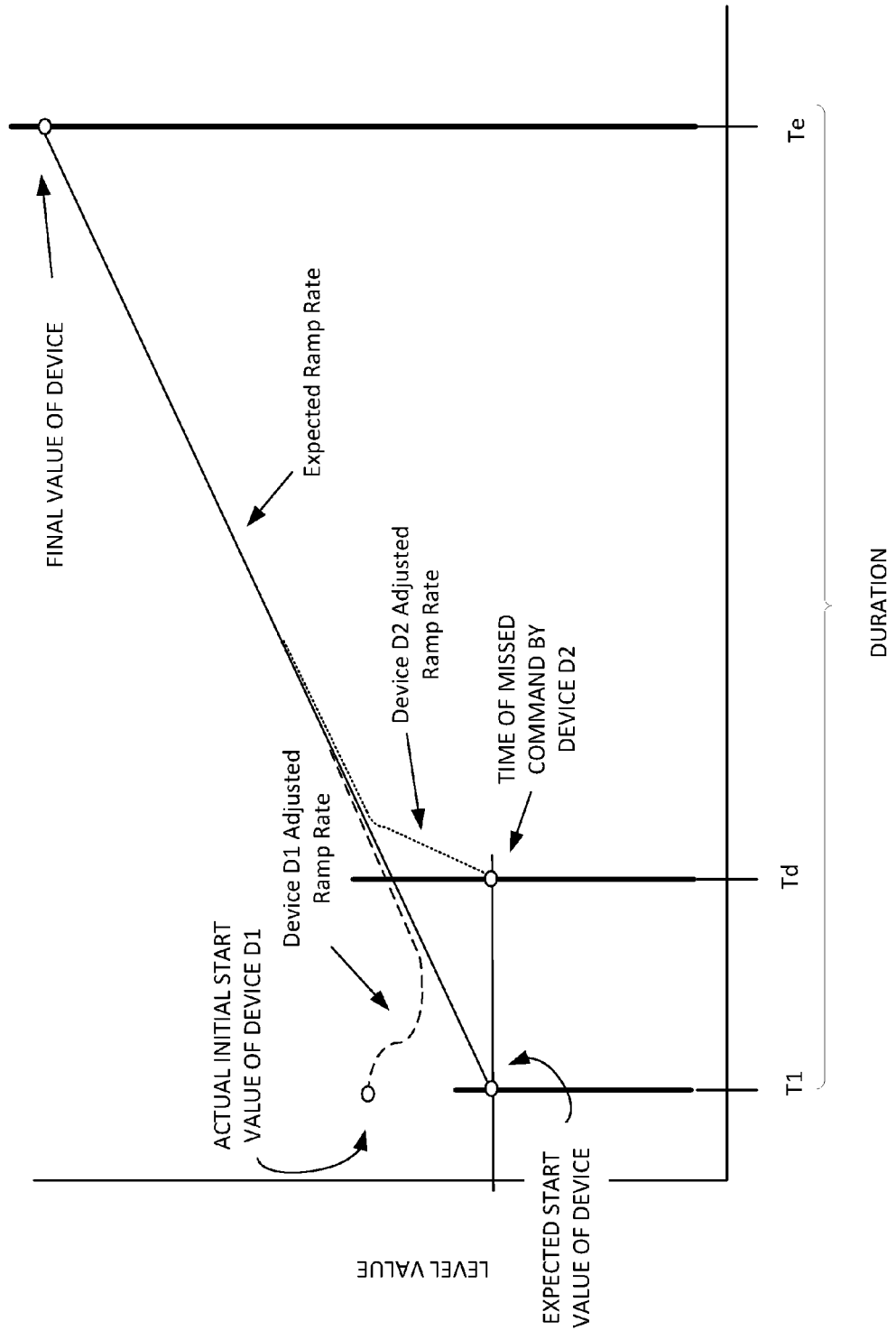
FIG. 2 shows a graphic describing another use scenario according to an implementation of the disclosed subject matter.

FIG. 2 illustrates a scenario for compensating for controller errors to synchronize operation of cooperating devices according to implementations of the disclosed subject matter. The graph of FIG. 2 has a time axis and a level value axis. The level value axis represents the output value for a controllable device. The level value may represent a voltage or other parameter related to the respective controllable device. In response to a user input, a controller may transmit an initial command to a plurality of controllable devices that are operating in coordination with one another to perform an action. For example, the controllable devices may be water pumps in a landscape water feature or motors for blinds. The controller may transmit at time T1 an initial performance request command to devices D1 and D2 (not shown). The initial performance request command may include an expected start value of the device. However, the device may have an actual initial start value that is greater than the expected start value. If this is left uncorrected, the device will not be synchronized with the operation of the other cooperating devices.

For example, as illustrated in FIG. 2, an initial performance request command may be transmitted, at time T1, by a controller to a plurality of cooperating devices including device D1. The initial performance request command may include, or may omit the expected start value. The expected start value may be a present output level that the controller expects from the controllable device. However, the actual initial start value of Device D1 may be different, either higher or lower. The actual initial start value may be the present output value of the device D1. For example, vertical window blinds may scroll back and forth on a track. If a user were to accidentally obstruct the movement of the blinds by placing a chair close to the window, a blind may catch on the chair and may not be able to fully open or close, so the device location or start value may not be the same as the controller expects. However, the controller may not receive a notification from each of the blind operating devices that the operation has been or has not been fully completed. Nor may the controller receive notification of the actual state of the devices. The controller may assume that the device has reached the commanded state without requiring the device to acknowledge completion of the operation or to even acknowledge receipt of the initial command. As a result, the controller may be sending commands that are based on an incorrect state of a device. To address this problem, device D1 may have a processor and memory to store the operating state of the device D1. Upon receipt of the initial control command, or performance request, command, the device D1 processor can compare the expected start value in the initial control command with the stored actual state and determine whether the expected start value is correct or incorrect. The start value may represent a controllable devices location state or output intensity. For example, it may represent a light brightness, a gas fireplaces burner intensity, a position of a blind along a track or a water pump output pressure. Using parameters from the initial control command, the processor may determine transition values that will synchronize the response of device D1 to the transition path of the other cooperating devices. For example, the processor may determine a plurality of transition values at respective periodic points along the expected ramp rate line, or determine a plurality of transition values that change value in specific increments (e.g., 25% increase). Using the plurality of transition values at the respective periodic point, the processor may calculate a plurality of device output values that may be stored in a buffer for output at a time corresponding to the calculated output value. Alternatively, the processor may calculate updated output values predetermined times. For example, FIG. 2 shows device D1's adjusted ramp rate from which updated output values may be calculated for a period of time between time T1 and Td, and after the adjusted ramp rate intersects the expected ramp rate, the processor may use the expected ramp rate to calculate the updated output values. The processor may calculate an output value nearly continuously to synchronize the performance of device D1 with other devices that are also performing the operation. The controllable devices may complete the performance in coordination in the duration time DURATION at end time Te.

Figure 3:
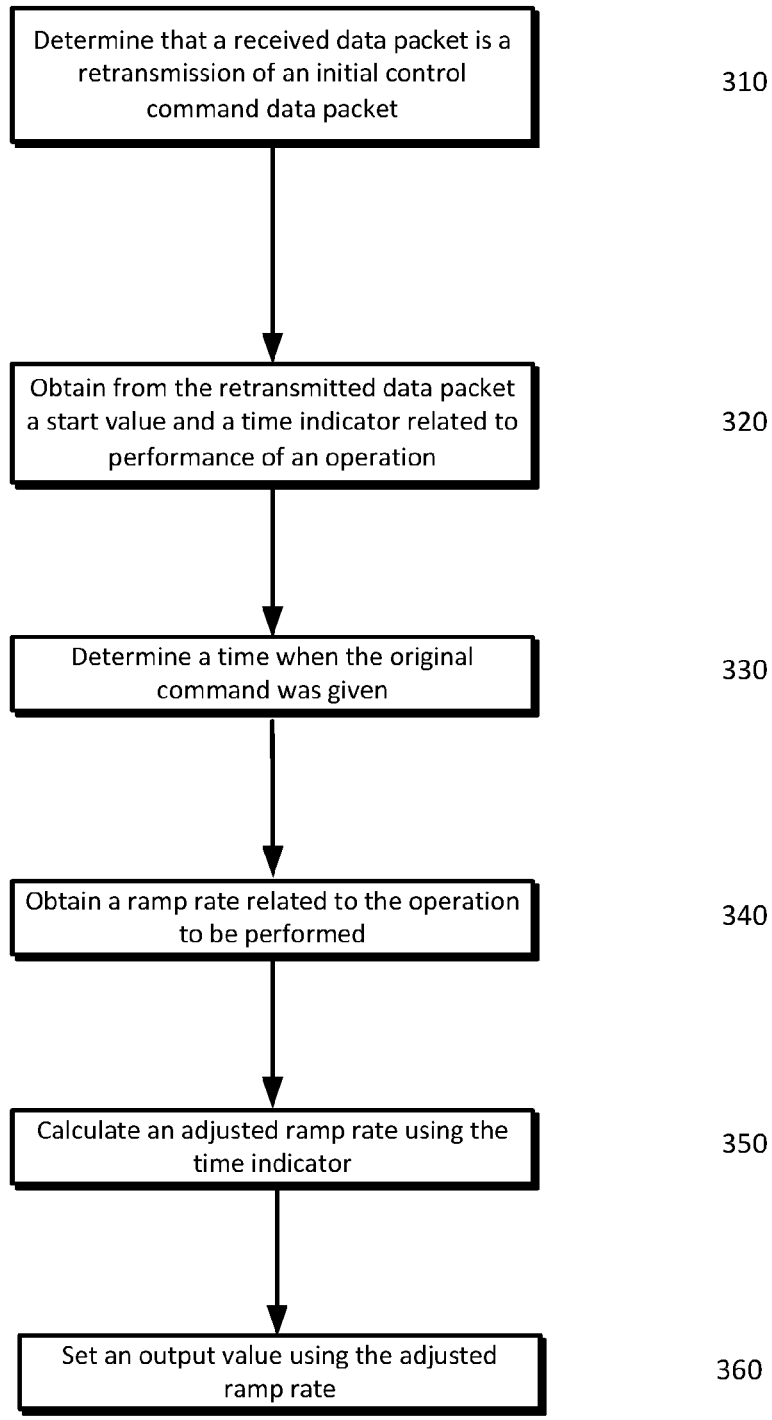
FIG. 3 shows a flowchart according to an implementation of the disclosed subject matter.

FIG. 3 also illustrates a process for synchronizing the performance of a controllable device that fails to receive, or only receives a portion of, an initial control command. With reference to the time line of FIG. 2, at time Td, a processor in the device, for example device D2, may perform the process steps shown in FIG. 3. The processor of device D2 may determine that a received data packet that includes the initial control command is a retransmission of an initial control command data packet (310). The retransmitted data packet may include operation commands that may cause a controllable device to perform an operation that was requested to be performed by a plurality of controllable devices. For example, the retransmitted data package may include an indicator bit indicating that the data package is a retransmission of an earlier data package. The retransmitted data packet may also include data in addition to the device parameters provided in the initial control command. For example, it may include an indicator of the time when the command was sent, a ramp rate for performance of the operation, a duration of the operation, an end time of the operation, a memory address location for the processor to check in the controllable device's memory which may store data related to the requested operation to be performed, or other data related to the initial performance request command.

From the retransmitted data packet, the controllable devices may obtain information, for example, a start value and a time indicator, related to performance of the operation (Step 320). The start value may be equal to an expected initial value setting of the device. The controllable device processor may determine a time when the original command was given using, for example, the time indicator (Step 330). Alternatively, the retransmitted initial performance request commands may be periodically transmitted so that any controllable devices that did not receive the initial command will be able to synchronize themselves to cooperating devices.

At step 340, a ramp rate related to the operation to be performed may be obtained from, for example, the retransmitted initial performance request command or from the controllable device's memory. Any one of, or combination of, the time indicator, obtained ramp rate, and/or duration may be used to calculate an adjusted ramp rate. The adjusted ramp rate, as shown in FIG. 2, is calculated so the controllable device that did not react to the initial performance request command may synchronize itself with the other cooperating devices. The controllable device that did not react to the initial performance request command may also be called the delayed device. This adjusted ramp rate may be calculated, at 350, so the delayed device sets its output values at points that allow the output of the delayed device to gracefully (e.g., without abrupt changes in output level) meet the expected ramp rate of the initial command.

Using the adjusted ramp rate calculated by the controllable device processor, the processor at step 360 may set an output value using the adjusted ramp rate that may result in completing the operation for the controllable device at substantially the same time as though the device received the original command, and/or at substantially at the same time as other devices that did receive and execute the original command.

Figure 4:
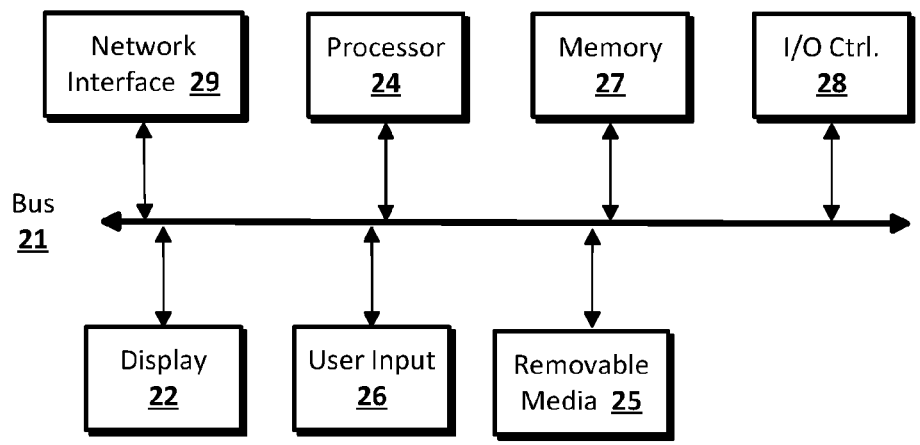
FIG. 4 shows a computer according to an implementation of the disclosed subject matter.

Implementations of the presently disclosed subject matter may be implemented in and used with a variety of component and network architectures. A controllable device may be a computing device. For example, FIG. 4 illustrates an example computer 20 suitable for implementations of the presently disclosed subject matter, such as the controllable device. The computer 20 may include a bus 21 which interconnects major components of the computer 20, such as a central processor 24, a memory 27 (typically RAM, but which may also include ROM, flash RAM, or the like), an input/output controller 28, a user display 22, such as indicator lights or a small display to indicate, for example, state information, a user input interface 26, which may include one or more controllers and associated user input devices such as mini or micro USB, and the like, and may be closely coupled to the I/O controller 28.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as memory 27 or other storage medium 25, for example, a micro SD card. The memory may also store preset responses to certain commands. For example, a command to open the blinds received by a controllable blind device may be performed using an end value and a ramp rate that have been preset by a user or at time of manufacture of the controllable device.

A network interface 29 may provide a direct connection to a remote server via a telephone link, to the Internet via an interne service provider (ISP), or a direct connection to a remote controller device, such as a home automation network controller or a home automation network gateway control device via a direct network link to the Internet through a Wi-Fi access point or other network via known techniques. The network interface 29 may provide such connection using wireless techniques, including digital cellular telephone connection, Z-wave, Bluetooth, Zigbee, 802.11 protocols, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, removable media 25, or on a remote storage location.

Figure 5:
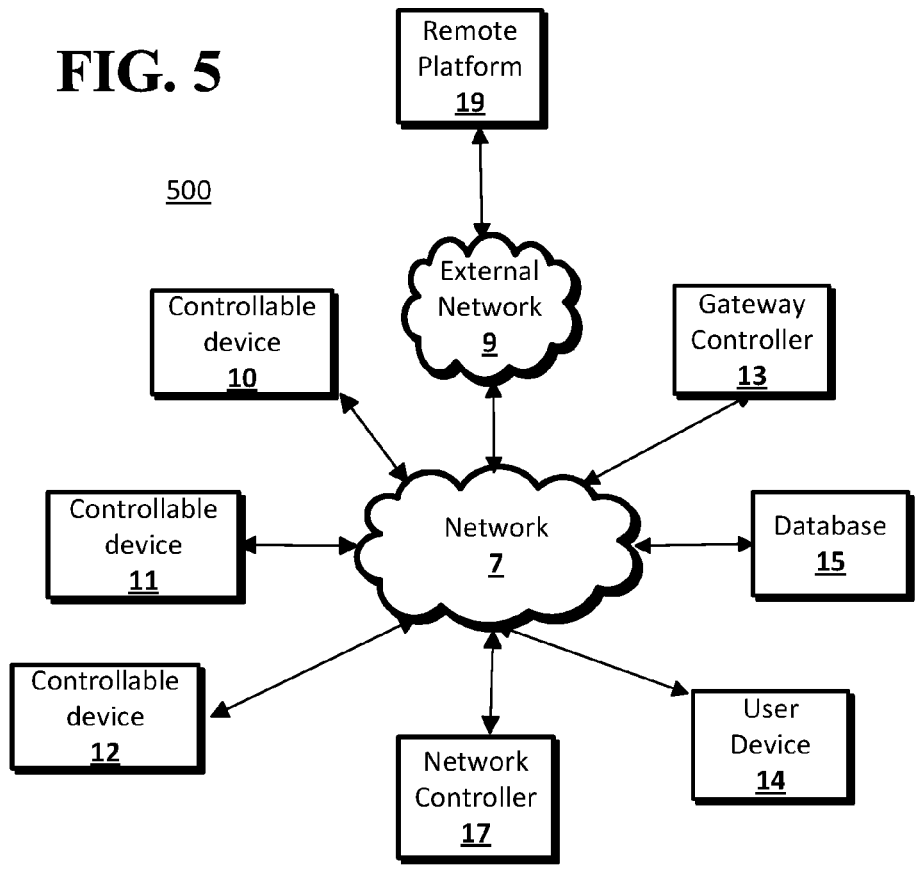
FIG. 5 shows a network configuration according to an implementation of the disclosed subject matter.

FIG. 5 shows an example network arrangement according to an implementation of the disclosed subject matter. One or more controllable devices 10, 11, 12, such as light bulbs, light fixtures may connect to other devices via one or more device communication networks 7. The communication network 7 may use a suitable communication protocol such as Zigbee, Z-wave, Bluetooth, Wi-Fi or other network communication protocols and operating frequency, such as 900 MHz, 2.4 GHz, 3.6 GHz or 5 GHz. A user device 14 may be a smart phone, tablet computing devices, a personal computer, a wall switch, a user presence detection device and the like that may communicate either directly or indirectly via network 7 with the controllable devices 10-12, the network controller 17, gateway controller 13 or database 15. A user presence detection device 14 may be a camera that allows a processor to recognize a user, a radio frequency (RF) device operating in combination with a RF device associated with a user, a cellphone detection device or other user presence detection system known for determining the presence of a user. The network 7 may be a local network, wide-area network, the Internet, or any other suitable communication network or networks, and may be implemented on any suitable platform including wired and/or wireless networks. The controllable devices 10-12 may communicate with one or more gateway controllers 13, network controller 17 and/or databases 15. The controllable devices 10, 11, 12 also may access remote platforms 19 or services provided by remote platforms 19 such as cloud computing arrangements and services via external network 9. The remote platform 19 may include one or more servers and/or databases in addition to or other than database 15.

A system 500 may include a plurality of controllable devices 10-12, a controller device, such network controller 17, gateway controller 15 or user device 14, and a communication network, such as network 7. The controllable output devices 10-12 may operate in coordination with one another to perform an operation, such as dimming/turning up light levels, lawn irrigation system, window blind operations or window opening operations and the like. A controller device, such as network controller 17, gateway controller 15 or user device 14 may be configured to control the plurality of controllable output devices 10-12. The communication network 7 may communicatively couple the controller device 13, 14 and/or 17 with the plurality of output devices 10-12. The controller devices may be configured to reissue a control command to the plurality of controllable devices. The control command may include a start value equal to an expected initial value setting of the device and an elapsed time from receipt of an original performance request until completion of the performance. The elapsed time may be used to determine an adjusted ramp rate that may allow the controllable device to catch up or synchronize its operation to that of the other controllable devices. The controllable devices 10-12 may be configured to obtain the start value and the elapsed time for performance of the operation from the reissued control command in response to a determination that the received command is a retransmission of the initial control command. The controllable devices 10-12 may determine a time when the initial control command was given and may compare a duration for the operation to the time delay indicated by the elapsed time. Based on the results of the comparison, the controllable devices 10-12 may set an output value for the device based on the start value, a ramp rate, and the duration.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    determining, by a processor in a controllable device of a plurality of controllable devices, a time indicator from a received data packet that is a retransmission for an operation having an operating rate;
    calculating an adjusted operation rate based on the time indicator; and
    setting an output value for the controllable device based on the adjusted operation rate.

2. The method of claim 1, wherein the time indicator includes at least one from the group consisting of: a time when a command for the operation was given, a duration of the operation.

3. The method of claim 1, wherein the adjusted operation rate results in at least one selected from the group consisting of: completing the operation by the controllable device at substantially the same time as other controllable devices executing the same action, and completing the operation at substantially the same time as though the device received an originally-transmitted data packet that corresponds to the received data packet.

4. The method of claim 1, wherein the setting an output value for the device is according to at least one from the group consisting of: an expected start value of the controllable device included in information obtained from the received data packet; a difference between the time when an original command related to a performance of the operation was given via an originally transmitted data packet and the time indicator in the received data packet; the time indicator related to a performance of the operation included in information obtained from the data packet that is retransmitted; an output end value of the controllable device at the completion of the operation included in information obtained from the data packet that is retransmitted; and an actual output value of the controllable device at a time a retransmitted performance request is received.

5. The method of claim 4, wherein the expected start value is an actual start value of the controllable device included in information obtained from the received data packet.

6. The method of claim 1, wherein the plurality of controllable devices are operating in cooperation to complete the operation.

7. The method of claim 1, further comprising:
    determining that an expected start value is different from an actual start value of the controllable device; and
    calculating the adjusted operation rate using the actual start value.

8. The method of claim 1, further comprising:
    receiving an operation performance request related to the plurality of controllable devices, wherein the operation performance request includes the received data packet.

9. A system comprising:
    a plurality of controllable devices operating in coordination with one another to perform an operation;
    a controller device configured to control the plurality of controllable devices; and
    a communication network communicatively coupling the controller device and the plurality of controllable devices,
    wherein the controller device is further configured to:
        determine a time indicator from a received data packet that is a retransmission for an operation having an operating rate;
        calculate an adjusted operation rate based on the time indicator determined from the received data packet; and
        set an output value for the controllable device based on the adjusted operation rate.

10. The system of claim 9, wherein the controller device is further configured to:
    generate an operation performance request that includes the data packet in response to an input signal.

11. The system of claim 9, wherein the data packet is retransmitted based on at least one selected from the group consisting of: at a preset time after a transmission of an initial data packet; at periodic times after the issuance of an initial data packet transmission.

12. The system of claim 9, wherein the adjusted operation rate results in completing the operation by the controllable device at substantially the same time as at least one of the plurality of controllable devices.

13. The system of claim 9, wherein the plurality of controllable devices operate in cooperation to complete the operation.

14. A device comprising:
    a controller to control a plurality of controllable devices; and
    a memory to store instructions executed by the controller, the instructions configured to:
        determine a time indicator from a received data packet that is a retransmission for an operation having an operating rate;
        calculate an adjusted operation rate based on the time indicator determined from the received data packet; and
        set an output value for a controllable device based on the adjusted operation rate.

15. The device of claim 14, wherein the controller is further configured to:
    generate an operation performance request that includes the data packet in response to an input signal.

16. The device of claim 14, wherein the data packet is retransmitted based on at a preset time after a transmission of an initial data packet.

17. The device of claim 14, wherein the data packet is retransmitted at periodic times after the issuance of an initial data packet transmission.

18. The device of claim 14, wherein the adjusted operation rate results in completing the operation by the controllable device at substantially the same time as at least one of the plurality of controllable devices.

19. The device of claim 14, wherein the plurality of controllable devices operate in cooperation to complete the operation.

20. The device of claim 14, wherein the controller received an operation performance request related to the plurality of controllable devices, wherein the operation performance request includes the received data packet.

* * * * *